(12) United States Patent
Okumura et al.

(10) Patent No.: US 6,693,659 B2
(45) Date of Patent: Feb. 17, 2004

(54) IMAGE FORMING APPARATUS WITH A PRINT HEAD HAVING VARIABLE LIGHTING PERIOD

(75) Inventors: Ryuichi Okumura, Osaka (JP); Hironori Ando, Osaka (JP); Yoshifumi Ishii, Osaka (JP); Hideo Umezawa, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 55 days.

(21) Appl. No.: 10/014,791

(22) Filed: Dec. 14, 2001

(65) Prior Publication Data

US 2002/0130947 A1 Sep. 19, 2002

(51) Int. Cl.[7] .................................................. B41J 2/47
(52) U.S. Cl. ........................................ 347/240; 347/252
(58) Field of Search .............................. 347/240, 237, 347/247, 251, 252, 254, 184; 358/406, 521, 536

(56) References Cited

U.S. PATENT DOCUMENTS

| | | | | |
|---|---|---|---|---|
| 4,688,051 A | * | 8/1987 | Kawakami et al. | 347/184 |
| 5,677,725 A | * | 10/1997 | Honbo et al. | 347/252 |
| 5,708,514 A | * | 1/1998 | Higuchi et al. | 358/406 |
| 6,184,915 B1 | * | 2/2001 | Atsumi et al. | 347/251 |

\* cited by examiner

*Primary Examiner*—Hai Pham
(74) *Attorney, Agent, or Firm*—Rabin & Berdo, P.C.

(57) ABSTRACT

In an image forming apparatus having an LED print head according to the present invention, the cycle period of a lighting reference clock signal is variably set according to the tone level of image data so as to variably set the lighting period of an LED according to the tone level of the image data. This makes it possible to provide a linear characteristic relationship between the image data and the tone level of a formed toner image for improvement of an image quality.

7 Claims, 19 Drawing Sheets

LIGHTING REFERENCE CLOCK SIGNAL FOR γ-CORRECTION

LIGHTING REFERENCE CLOCK SIGNAL FOR REPRODUCTION WITH LOWER IMAGE DENSITY

LIGHTING REFERENCE CLOCK SIGNAL FOR REPRODUCTION WITH HIGHER CONTRAST

LIGHTING REFERENCE CLOCK SIGNAL FOR REPRODUCTION WITH HIGHER IMAGE DENSITY

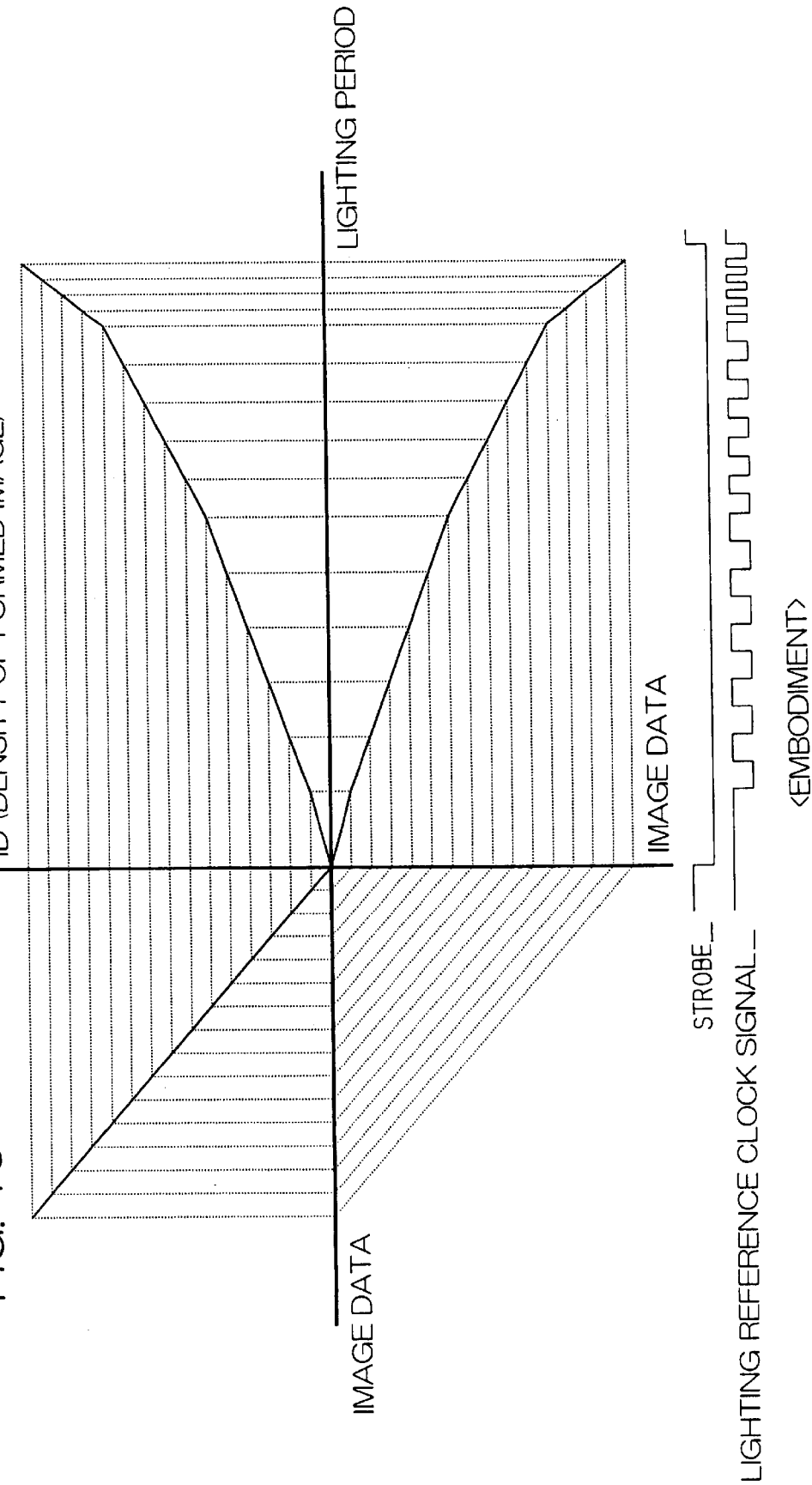

IMAGE FORMING APPARATUS WITH A PRINT HEAD HAVING VARIABLE LIGHTING PERIOD

This application is based on an application No. 2000-385759 filed in Japan, the content of which is incorporated herein by reference.

BACKGROUND OF THE INVENTION

1. Field of the Invention

The present invention relates to an image forming apparatus for use as a copying machine, a facsimile machine, a printer or the like and, more particularly, to an image forming apparatus having an LED print head for exposure of a photoreceptor surface.

2. Description of Related Art

Some of image forming apparatuses such as copying machines and printers adapted for electrophotographic image formation are known to employ an LED print head for formation of an electrostatic latent image. In such an apparatus, the LED print head is opposed to the surface of a photoreceptor drum, and has an elongate shape extending alongside the axis of the photoreceptor drum. The LED print head includes about 7,000 LEDs arranged in line.

The lighting period of each of the LEDs of the LED print head is controlled on the basis of a lighting clock signal, and is variably set depending on the tone level of image data. As a result, a longer lighting period allows for heavier exposure of the photoreceptor drum surface, whereby a greater amount of toner adheres onto an exposed area of the photoreceptor drum surface for formation of a thick image. On the other hand, a shorter lighting period allows for lighter exposure of the photoreceptor drum surface, whereby a smaller amount of toner adheres onto an exposed area of the photoreceptor drum surface for formation of a thinner image.

The lighting clock signal for controlling the lighting period of each of the LEDs of the conventional LED print head typically has a constant cycle period, so that the lighting period of the LED is merely controlled so as to have a length which is an integral multiple of the cycle period.

However, the amount of the toner caused to adhere onto the exposed area and the LED lighting period (or the exposure period of the photoreceptor drum surface) are not in a linear relationship but in a nonlinear relationship. Even if the exposure period is increased in a linearly proportional relationship to the tone level of the image data, the density of a toner image and the tone level of the image data are not in a linear relationship because an image development characteristic is nonlinear. Therefore, the density of the toner image is slightly inconsistent with the tone level of the image data.

To solve this problem, it is an object of the present invention to provide an image forming apparatus which has an LED print head and ensures image formation with excellent tone reproducibility.

SUMMARY OF THE INVENTION

In accordance with the present invention, there is provided an electrophotographic image forming apparatus which includes an LED print head having a multiplicity of LEDs disposed in an array for exposure of a photoreceptor surface, the image forming apparatus comprising: lighting period setting means which predefines a relationship between an image density and a lighting period; and LED driving means which reads lighting periods according to tone levels of inputted image data from the lighting period setting means and lights the respective LEDs of the LED print head for the read lighting periods.

In the present invention, the lighting periods to be employed for lighting the respective LEDs of the LED print head can be set nonlinearly, so that the LEDs can respectively be lighted for optimum lighting periods according to the tone levels of the inputted image data. As a result, the exposure periods can flexibly and properly be correlated with the tone levels of the image data in accordance with the nonlinear characteristic relationship between the tone levels of the image data and the exposure periods. Thus, image formation can be achieved with excellent tone reproducibility.

That is, it is possible to provide a linear characteristic relationship between the image data and the tone of a toner image for improvement of an image quality.

In the image forming apparatus, the relationship between the LED lighting period and the print image density varies depending on intrinsic characteristics of the apparatus, e.g., the characteristics of the photoreceptor drum and condition settings such as settings of an image development potential and an image transfer potential. Therefore, it is preferred to prepare a plurality of lookup tables for various relationships between the number of pulses of a reference clock signal and the tone level, and selectively employ any of the lookup tables.

Further, the lookup tables are preferably rewritable.

With the aforesaid arrangement, the image forming apparatus according to the present invention is excellent in image forming performance, particularly, in tone reproducibility.

BRIEF DESCRIPTION OF THE DRAWINGS

FIG. 19 is a graph illustrating relationships between the tone level of image data, a lighting period and the density of a formed toner image obtained through the lighting control timing according to the third embodiment of the invention.

DESCRIPTION OF PREFERRED EMBODIMENTS

With reference to the attached drawings, the present invention will hereinafter be described by way of specific embodiments thereof.

Figure 1A:
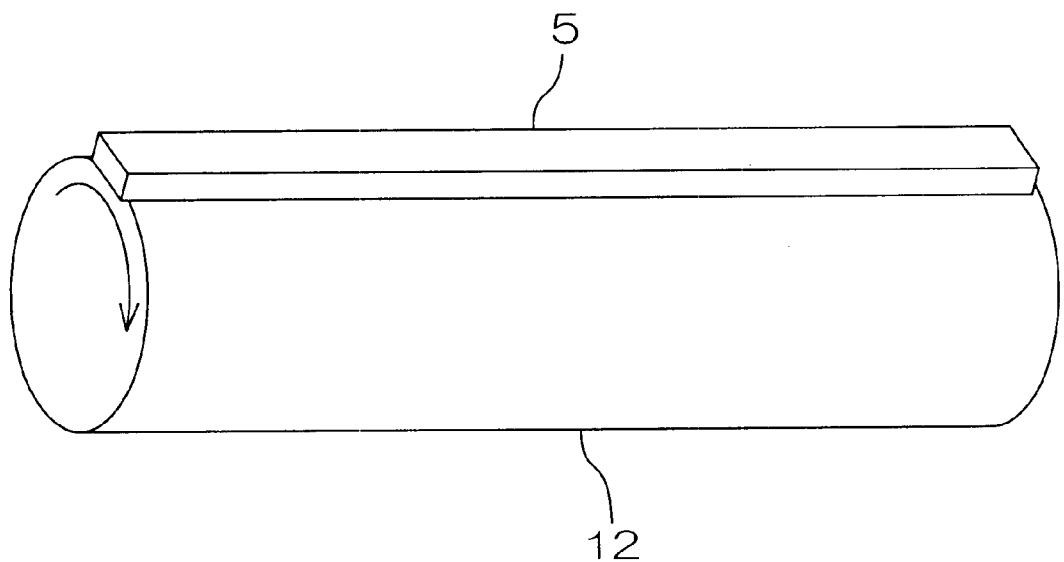
FIGS. 1A and 1B are schematic diagrams illustrating a positional relationship between a photoreceptor drum and an LED print head provided in an image forming apparatus according to a first embodiment of the present invention.
Figure 1B:
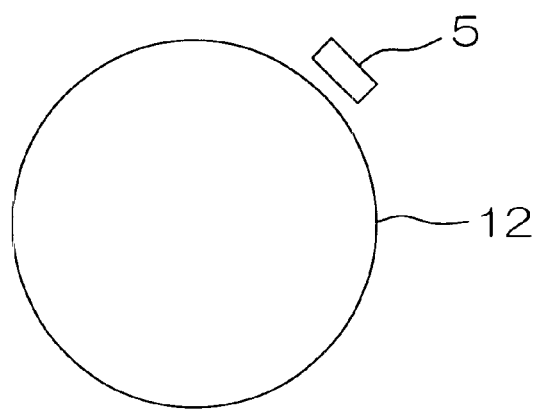

FIGS. 1A and 1B are schematic diagrams illustrating a positional relationship between a photoreceptor drum 12 and an LED print head 5 provided in an image forming apparatus according to a first embodiment of the present invention. As shown in FIGS. 1A and 1B, the photoreceptor drum 12 is an elongate cylinder extending along its axis, and has a photoreceptor layer provided on the surface thereof. The photoreceptor layer of the photoreceptor drum 12 is electrically charged at a predetermined potential by a discharger not shown.

The LED print head 5 extends alongside the axis of the photoreceptor drum 12 and is opposed to the surface of the photoreceptor drum 12. The LED print head 5 includes a multiplicity of LEDS arranged longitudinally thereof. Where the image forming apparatus is adapted to form an image having a resolution of 600 dpi on a JIS A3 sheet, for example, the LED print head 5 includes 7,000 LEDs arranged in series. The LEDs are each provided with a driver for controlling the lighting of the LED, and individually controlled for ON/OFF and a lighting period thereof.

A longer LED lighting period allows for heavier exposure of the surface of the photoreceptor drum 12, whereby a greater amount of toner adheres onto an exposed area of the photoreceptor drum surface. On the contrary, a shorter LED lighting period allows for lighter exposure of the surface of the photoreceptor drum 12, whereby a smaller amount of toner adheres onto an exposed area of the photoreceptor drum surface. The tone of a formed toner image varies depending on the amount of the toner adhering onto the surface of the photoreceptor drum 12.

Figure 2:
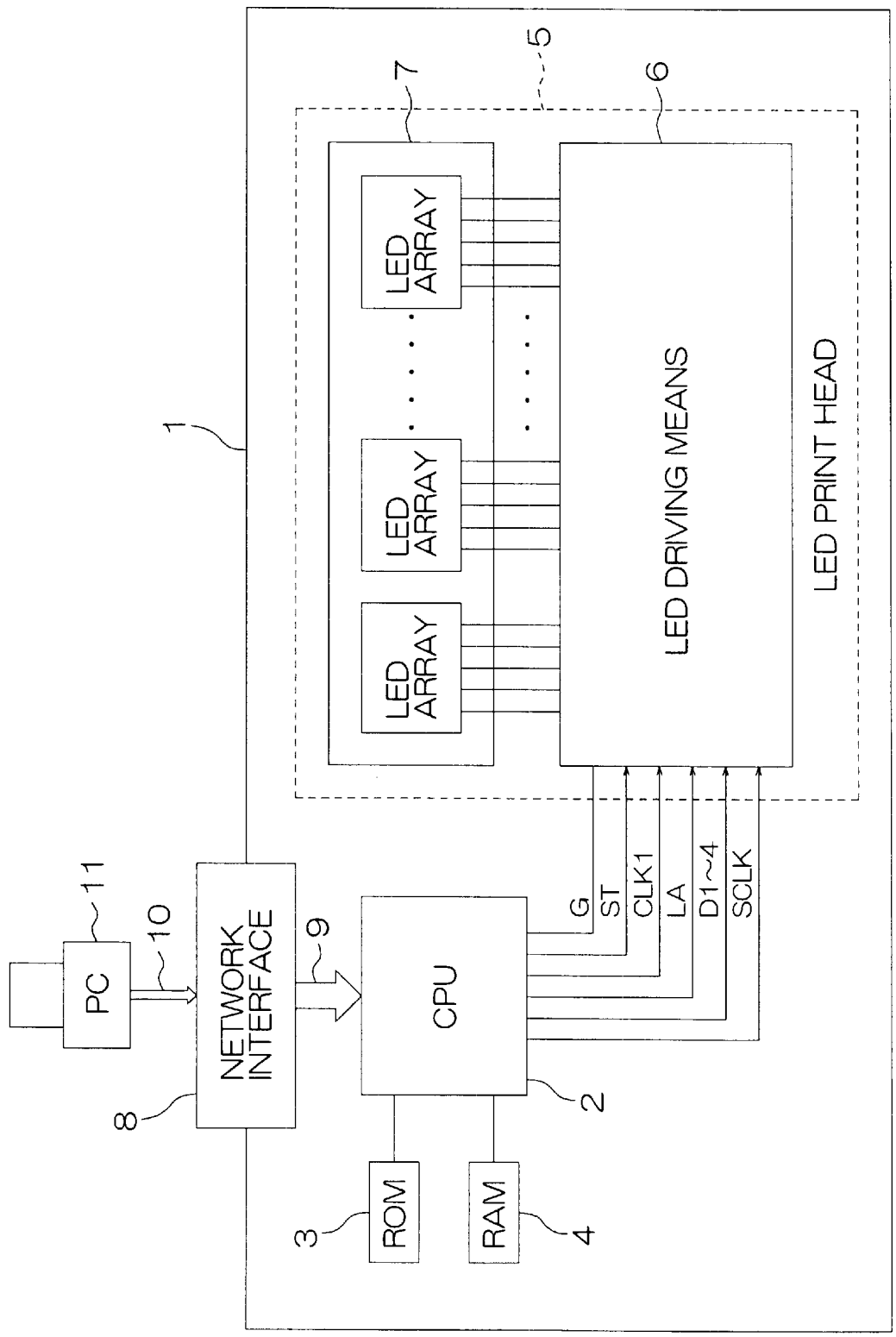
FIG. 2 is a block diagram illustrating the construction of a printer having an LED print head.

FIG. 2 is a block diagram illustrating the construction of a printer as the image forming apparatus having the LED print head 5. As shown, a CPU 2, a ROM 3, a RAM 4, the LED print head 5 which includes LED driving means 6 and an LED head 7, a network interface 8, and an internal bus 9 are provided in a printer body 1 of the printer. Image data is sent to the printer from a personal computer 11 which is connected to the printer, for example, via a network cable 10.

Figure 3:
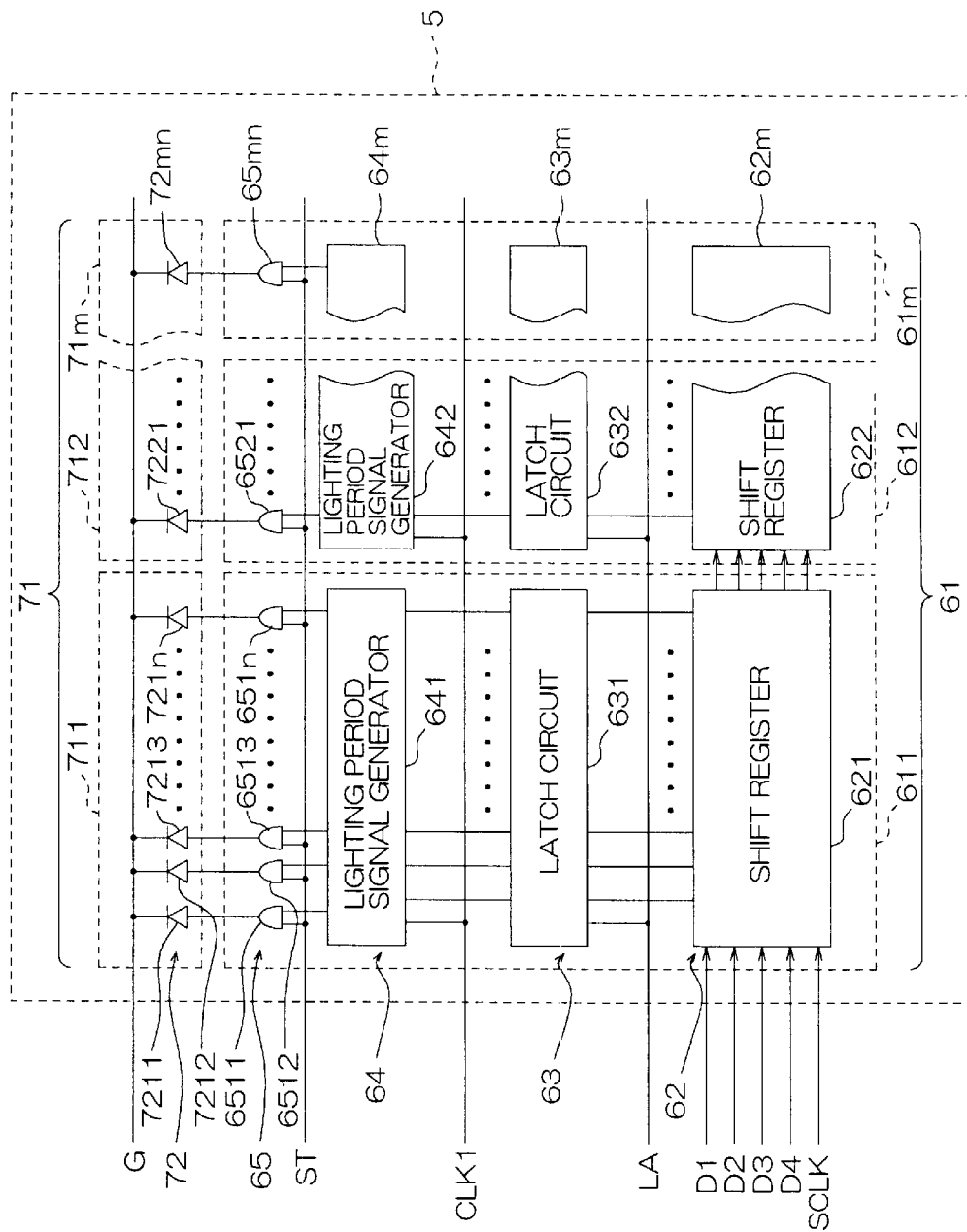
FIG. 3 is a block diagram illustrating the construction of the LED print head.

FIG. 3 illustrates the construction of the LED print head 5. The LED print head 5 is of a tonal type, and includes m LED array chips 71 (711 to 71m) each incorporating n LEDs 72 (7211 to 721n, . . . , 7221, . . . , 72mn) wherein m and n are positive integers, and m LED driver circuit chips 61 (611 to 61m) for driving the LEDs 72 in the corresponding LED arrays 71. An explanation will hereinafter be given to the LED driver circuits 61 for driving the corresponding LED arrays 71.

Where the LED print head 5 is of a 4-bit tonal type, for example, the LED driver circuits 61 (611 to 61m) respectively include latch circuits 63 (631 to 63m) for 4 bits×n dots, shift registers 62 (621 to 62m) for 4 bits×n dots, and AND circuits 65 (6511 to 65mn) for n dots. Tone data is applied to the first LED driver circuit 611 from data lines D1 to D4 in synchronization with a shift clock signal from a shift clock signal line SCLK. The tone data is shifted in the shift register 621 and, when the (n+1)-th data is applied to the shift register 621, the first inputted tone data enters the shift register 622 of the second LED driver circuit 612. Thus, the 4-bit tone data is successively shifted in the shift registers 621 to 62m and, when n×m sets of tone data are inputted, all the shift registers 621 to 62m retain the inputted tone data. Then, a latch signal is applied from a latch signal line LA, and the tone data is latched in the latch circuits 631 to 63m in synchronization with the application the latch signal. Subsequently, lighting period signal generators 64 (641 to 64m) respectively output lighting period signals according to tone levels on the basis of the 4-bit tone data and a lighting reference clock signal from a signal line CLK1. Then, the lighting period signals are ANDed with a strobe signal from a strobe signal line ST in the respective AND circuits 6511 to 65mn, which in turn output lighting signals for lighting the LEDs 7211 to 72mn. A reference character G denotes a ground line.

Figure 4:
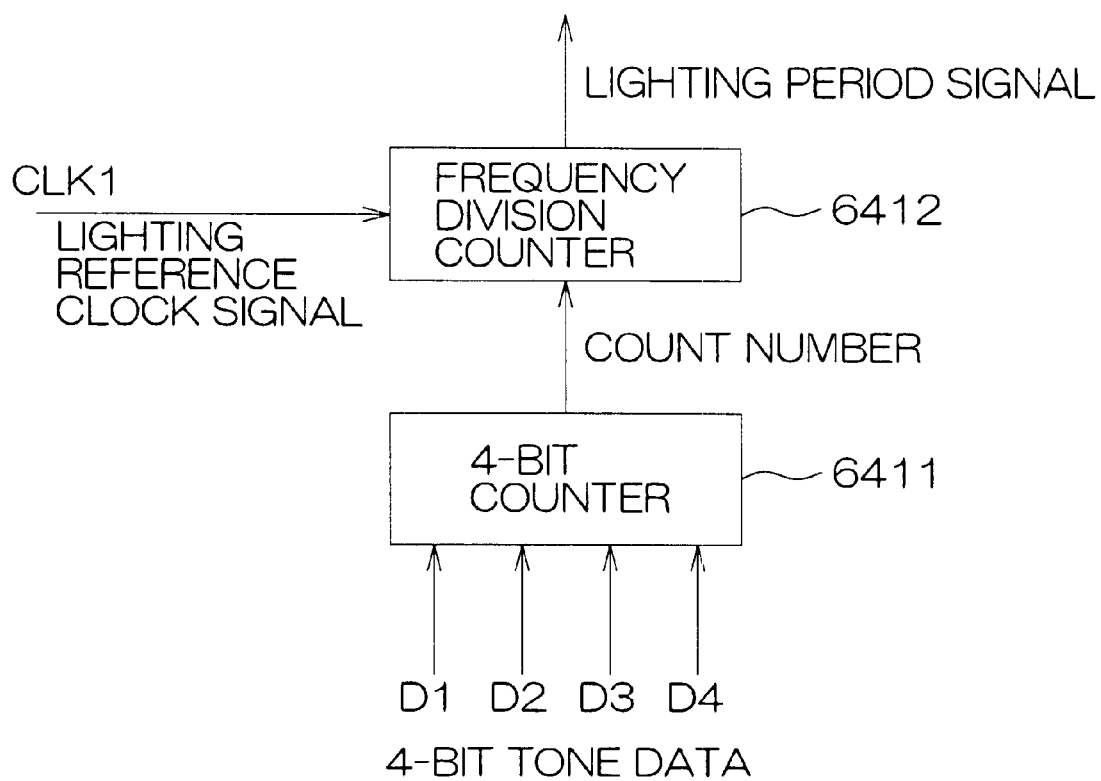
FIG. 4 is a block diagram illustrating the construction of a lighting period signal generator.

The lighting period signal generator 641, for example, has a construction as shown in FIG. 4. The lighting period signal generator 641 includes a 4-bit counter 6411 and a frequency division counter 6412. When the tone data is inputted from the data lines D1 to D4, according to the inputted tone data, the 4-bit counter 6411 outputs a value (count number) of 0 to 15. The frequency division counter 6412 receives the count number inputted from the 4-bit counter 6411 and the lighting reference clock signal inputted from the signal line CLK1, and counts the number of falling edges of the lighting reference clock signal. The frequency division counter 6412 continuously outputs the lighting period signal until the number of the falling edges reaches the inputted count number.

Figure 5:
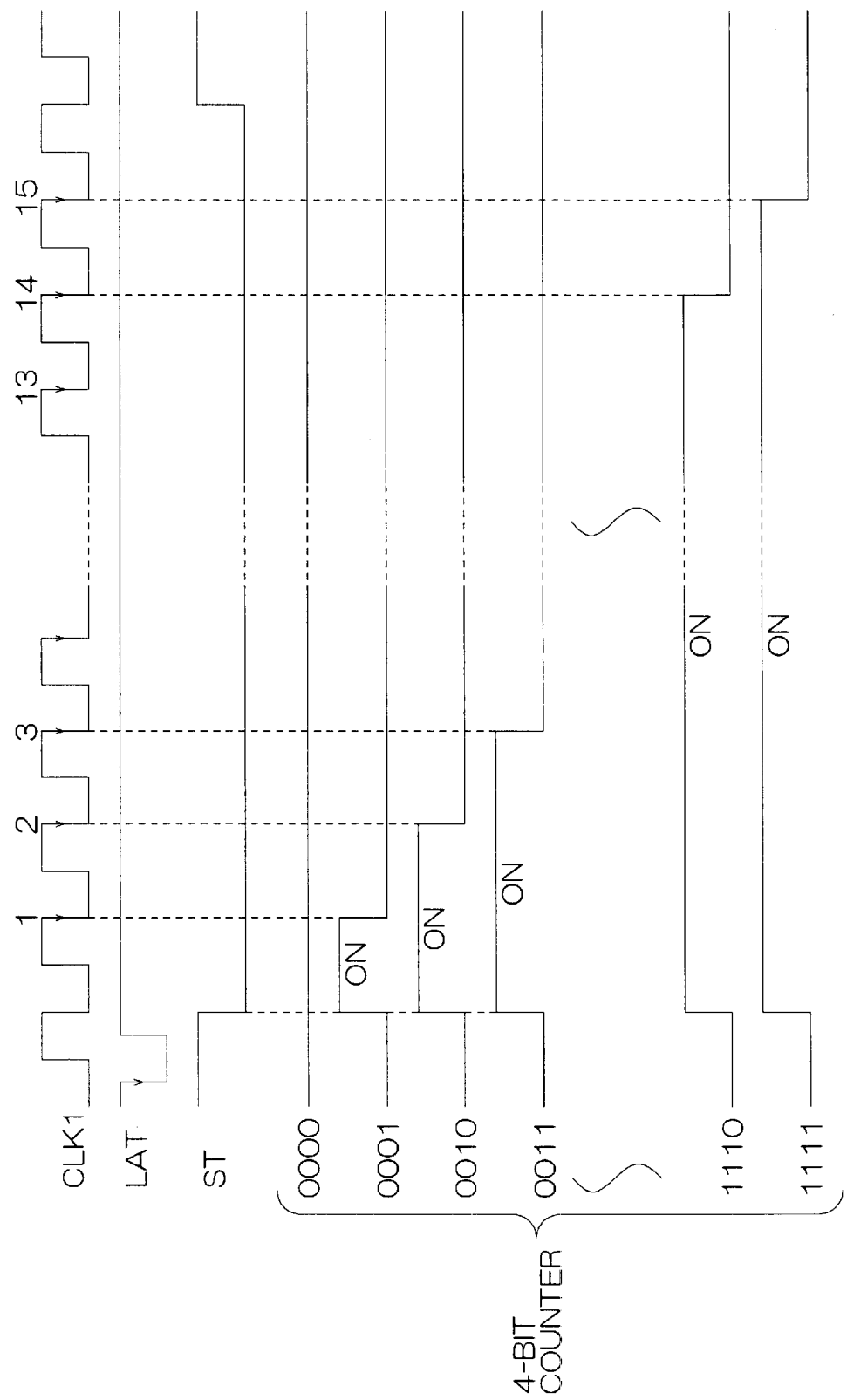
FIG. 5 is a timing chart for explaining the operation of a prior-art lighting period signal generator.

As shown in a timing chart of FIG. 5, the lighting period signal is generated in response to falling of the strobe signal from the strobe signal line ST. The lighting period generators 64 are respectively provided for the LEDs 72.

In the aforesaid lighting control, however, the tone data and the LED lighting period are merely controlled in a proportional relationship. This is because the lighting reference clock signal has a rectangular waveform and a constant frequency which is divided by the count number based on the tone data, so that the count number is proportional to the lighting period.

Figure 6:
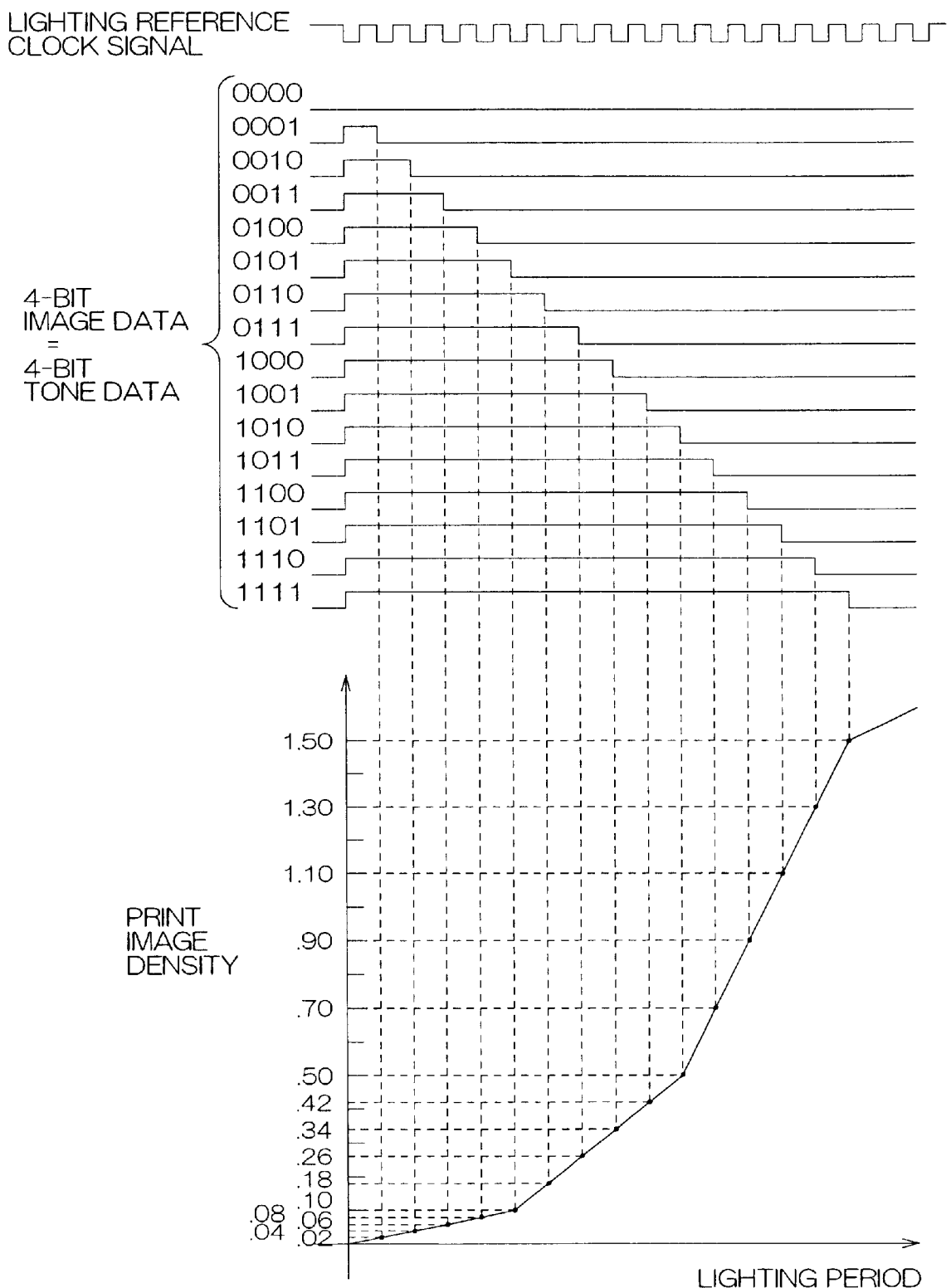
FIG. 6 is a diagram for explaining a γ-characteristic indicative of a non-proportional relationship between a lighting period and a print image density.

In the electrophotographic image forming apparatus, a print image density (ID) is not necessarily proportional to the period and intensity of the exposure of the photoreceptor drum, depending on the sensitivity characteristic of the photoreceptor drum and settings of an image development potential and an image transfer potential. Where an image is printed by employing 4-bit image data not subjected to a γ-conversion as the tone data, the lighting period (or the tone data linearly proportional to the lighting period) and the print image density are not in a proportional relationship, but in a γ-characteristic relationship as shown in FIG. 6. Accordingly, an increase in the print image density (ID) with respect to the tone data is smaller when the tone data has a smaller value, and is greater when the tone data has a greater value. Therefore, when image data inputted from the personal computer or a scanner is converted into tone data for use in the printer, there is a need to perform a γ-conversion of the inputted image data with the use of a γ-conversion lookup table according to the γ-characteristic of a printer engine to make the print image density proportional to the value of the inputted image data.

TABLE 1

| Image data | Tone data after γ-conversion | Output period of lighting period signal | Image density |
|---|---|---|---|
| 0000 | 0000 | No output | 0.0 |
| 0001 | 0101 | ON for 5 pulses | 0.1 |
| 0010 | 0110 | ON for 6 pulses | 0.18 |
| 0011 | 1000 | ON for 8 pulses | 0.34 |
| 0100 | 1001 | ON for 9 pulses | 0.42 |
| 0101 | 1010 | ON for 10 pulses | 0.50 |
| 0110 | 1011 | ON for 11 pulses | 0.70 |
| 0111 | 1011 | ON for 11 pulses | 0.70 |
| 1000 | 1100 | ON for 12 pulses | 0.90 |
| 1001 | 1100 | ON for 12 pulses | 0.90 |
| 1010 | 1101 | ON for 13 pulses | 1.10 |
| 1011 | 1101 | ON for 13 pulses | 1.10 |
| 1100 | 1110 | ON for 14 pulses | 1.30 |
| 1101 | 1110 | ON for 14 pulses | 1.30 |
| 1110 | 1111 | ON for 15 pulses | 1.50 |
| 1111 | 1111 | ON for 15 pulses | 1.50 | image density, but actually capable of reproducing only 11 levels of image density. As a result, the printer fails to precisely reproduce an image portion having a greater print image density (ID). Particularly where the image density within a halftone range cannot precisely be reproduced, a false contour is liable to occur in the image. Therefore, it is preferred that the tone data inputted to the print head and the print image density are in a proportional relationship, and the relationship can easily be modified.

In this embodiment, the lighting reference clock signal is determined in the following manner.

Figure 8A:
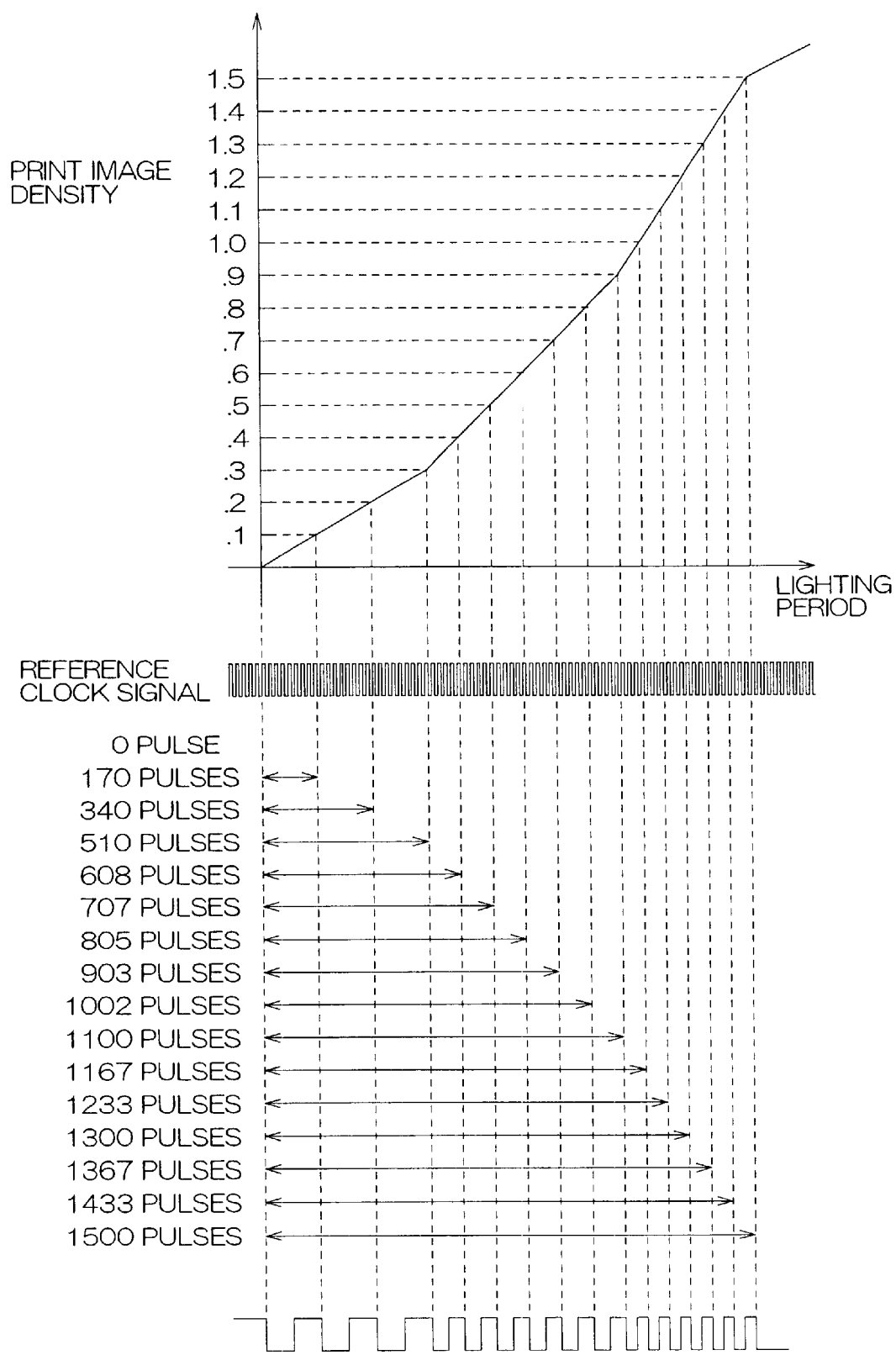
FIGS. 8A and 8B are diagrams for explaining how to determine the lighting period on the basis of image density data.
Figure 8B:
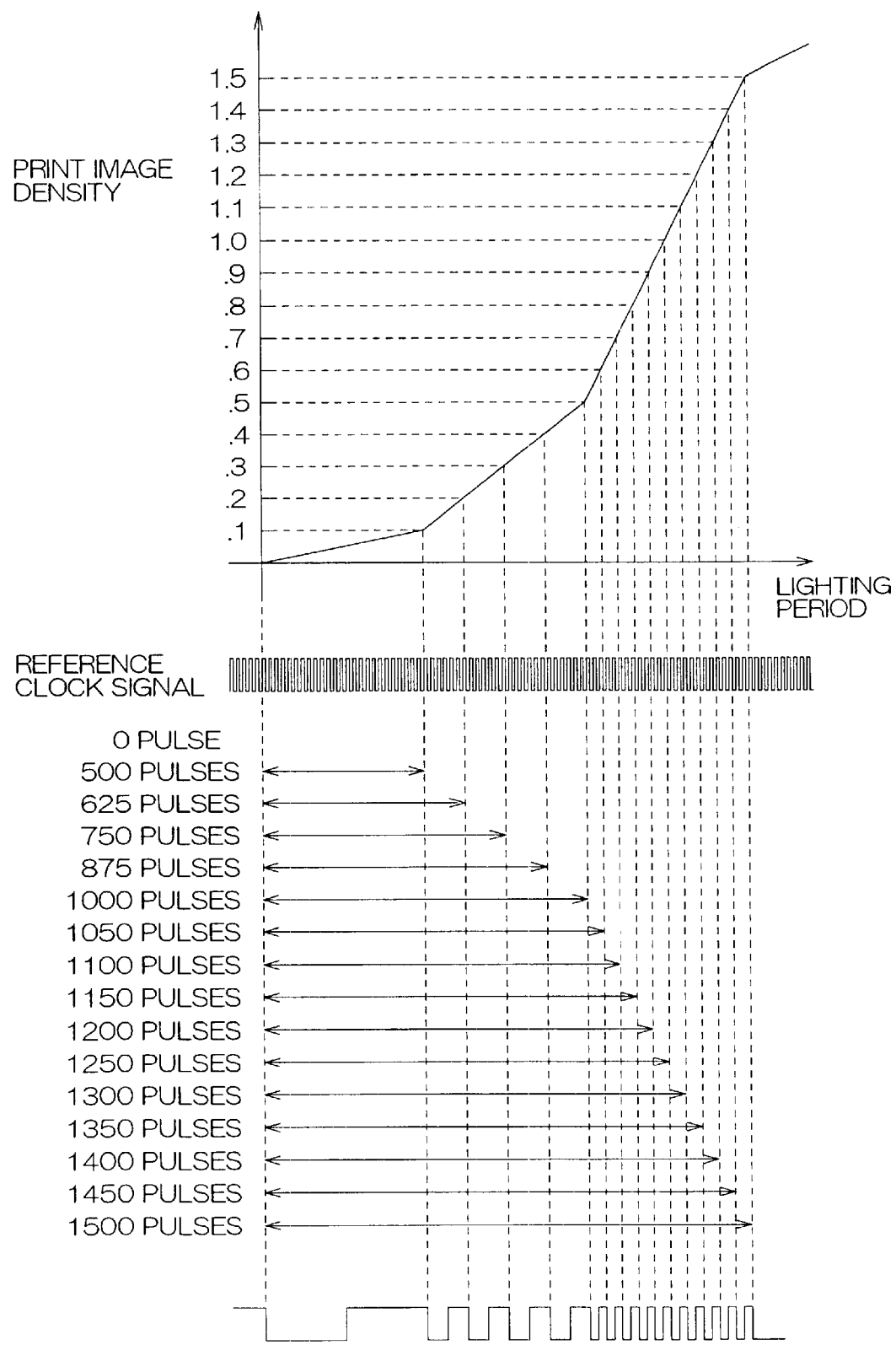

With reference to FIGS. 8A and 8B, an explanation will be given to how to determine the lighting reference clock signal (to be outputted from the signal line CLK1). With the use of the printer, a patch is printed on the basis of given tone data, and read by means of a scanner for generation of image data. Then, the relationship between the lighting period and the print image density is determined on the basis of measurement data. Where the relationship thus determined is substantially linear, a γ-curve as shown in FIG. 8A is obtained (a printer with a γ-pattern A). Where the relationship has a distinctive γ-characteristic, a γ-curve as shown in FIG. 8B is obtained (a printer with a γ-pattern B). The γ-characteristic is determined by the characteristics of the photoreceptor drum, and the settings of the image development potential and the image transfer potential.

The range of the print image density is equally divided to define a plurality of density levels, and lighting periods are determined for the respective density levels. More specifically, the 4-bit tone data (16-level tone) is employed with an effective maximum image density level being set at 1.5 in the printer and, therefore, lighting periods are determined for the respective density levels in 0.1 increments.

TABLE 2

| Image density (ID) | 4-bit tone data | | | | Lighting period for γ pattern A[*1] | Lighting period for γ pattern B[*1] | Output signal of frequency division counter[*2] |
|---|---|---|---|---|---|---|---|
| | D1 | D2 | D3 | D4 | | | |
| 0.0 | 0 | 0 | 0 | 0 | 0 pulse | 0 pulses | No output |
| 0.1 | 0 | 0 | 0 | 1 | 170 pulses | 500 pulses | ON for 1 pulse |
| 0.2 | 0 | 0 | 1 | 0 | 340 pulses | 625 Pulses | ON for 2 pulses |
| 0.3 | 0 | 0 | 1 | 1 | 510 pulses | 750 pulses | ON for 3 pulses |
| 0.4 | 0 | 1 | 0 | 0 | 608 pulses | 875 pulses | ON for 4 pulses |
| 0.5 | 0 | 1 | 0 | 1 | 707 pulses | 1000 pulses | ON for 5 pulses |
| 0.6 | 0 | 1 | 1 | 0 | 805 pulses | 1050 pulses | ON for 6 pulses |
| 0.7 | 0 | 1 | 1 | 1 | 903 pulses | 1100 pulses | ON for 7 pulses |
| 0.8 | 1 | 0 | 0 | 0 | 1002 pulses | 1150 pulses | ON for 8 pulses |
| 0.9 | 1 | 0 | 0 | 1 | 1100 pulses | 1200 pulses | ON for 9 pulses |
| 1.0 | 1 | 0 | 1 | 0 | 1167 pulses | 1250 pulses | ON for 10 pulses |
| 1.1 | 1 | 0 | 1 | 1 | 1233 pulses | 1300 pulses | ON for 11 pulses |
| 1.2 | 1 | 1 | 0 | 0 | 1300 pulses | 1350 pulses | ON for 12 pulses |
| 1.3 | 1 | 1 | 0 | 1 | 1367 pulses | 1400 pulses | ON for 13 pulses |
| 1.4 | 1 | 1 | 1 | 0 | 1433 pulses | 1450 pulses | ON for 14 pulses |
| 1.5 | 1 | 1 | 1 | 1 | 1500 pulses | 1500 pulses | ON for 15 pulses |

Figure 7:
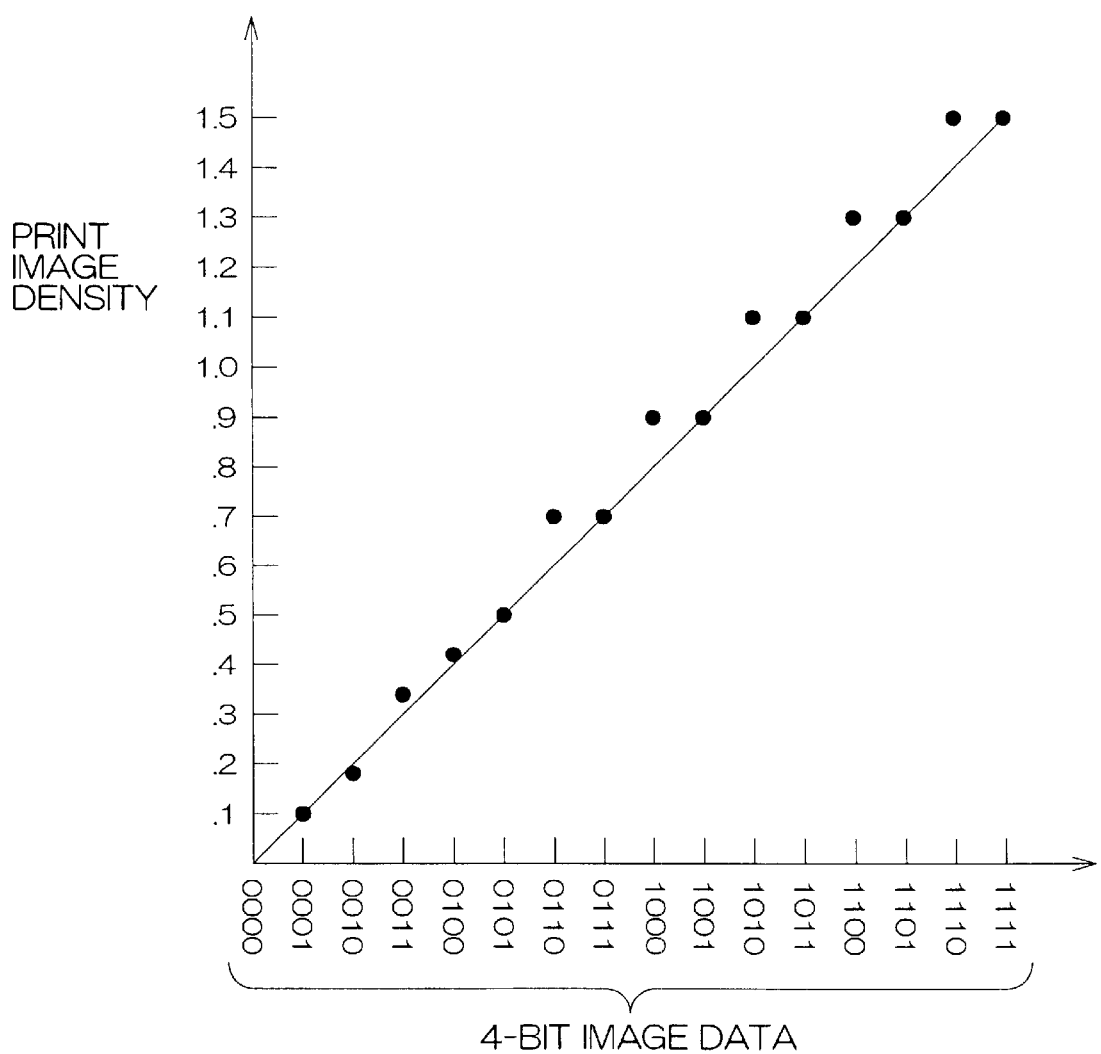
FIG. 7 is a diagram for explaining a relationship between image data and an image density obtained after a γ-conversion.

[*1] 1 pulse = 1 reference clock pulse
[*2] 1 pulse = 1 lighting reference clock pulse Table 1 shows the density of an image printed on the basis of 4-bit tone data generated through the γ-conversion of 4-bit image data. Thus, the original image data is substantially proportional to the density of the print image as shown in FIG. 7. However, the LED print head cannot output particular image density levels within an effective image density range, so that the image density is not proportional to the image data in a stricter sense. With the 4-bit tone data, the printer is in principle required to reproduce 16 levels of In Table 2, the lighting periods for the respective density levels are each represented by the number of pulses of a reference clock signal (CPU clock signal), and stored as the lighting reference clock lookup table in the RAM 4 shown in FIG. 2.

Referring again to FIGS. 8A and 8B, an explanation will be given to how to determine the waveform of the lighting reference clock signal on the basis of the lighting reference clock lookup table. As described above, the lighting period signal generator 641 shown in FIG. 4 counts the inputted tone data, and subjects the lighting reference clock signal to the frequency division on the basis of the count number to output the lighting period signal.

In the case of the printer with the γ-pattern A, the count number is "0" for the input of tone data 0000, so that no pulse is outputted from the lighting period signal generator 641. For the input of tone data 0001, the count number is "1", so that the lighting reference clock signal has the first falling edge at the 170th reference clock pulse. For the input of tone data 0010, the count number is "2", so that the lighting reference clock signal has the second falling edge at the 340th reference clock pulse. Likewise, the count number is "15" for the input of tone data 1111, so that the lighting reference clock signal has the 15th falling edge at the 1500th reference clock pulse. In this manner, the waveform of the lighting reference clock signal is determined by determining time points at which the lighting reference clock signal has falling edges for the respective count numbers.

Similarly, in the case of the printer with the γ-pattern B, the count number is "0" for the input of tone data 0000, so that no pulse is outputted from the lighting period signal generator 641. For the input of tone data 0001, the count number is "1", so that the lighting reference clock signal has the first falling edge at the 500th reference clock pulse. For the input of tone data 0010, the count number is "2", so that the lighting reference clock signal has the second falling edge at the 625th reference clock pulse. Likewise, the count number is "15" for the input of tone data 1111, so that the lighting reference clock signal has the 15th falling edge at the 1500th reference clock pulse. In this manner, the waveform of the lighting reference clock signal is determined.

Figure 9A:
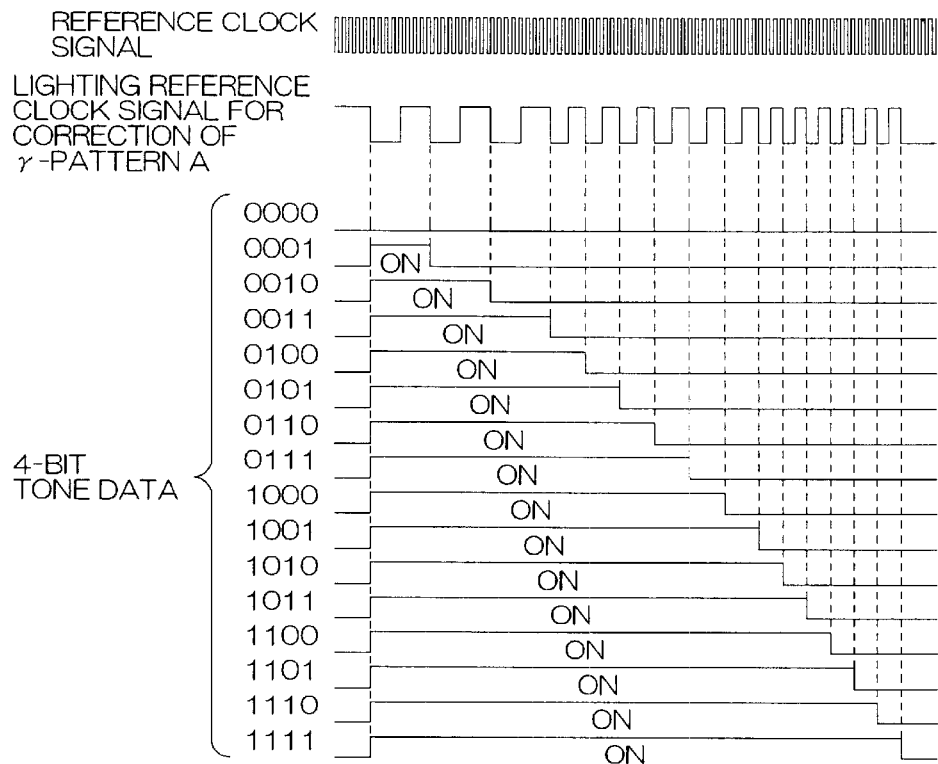
FIGS. 9A and 9B are diagrams for explaining a relationship between 4-bit tone data and a lighting period signal.
Figure 9B:
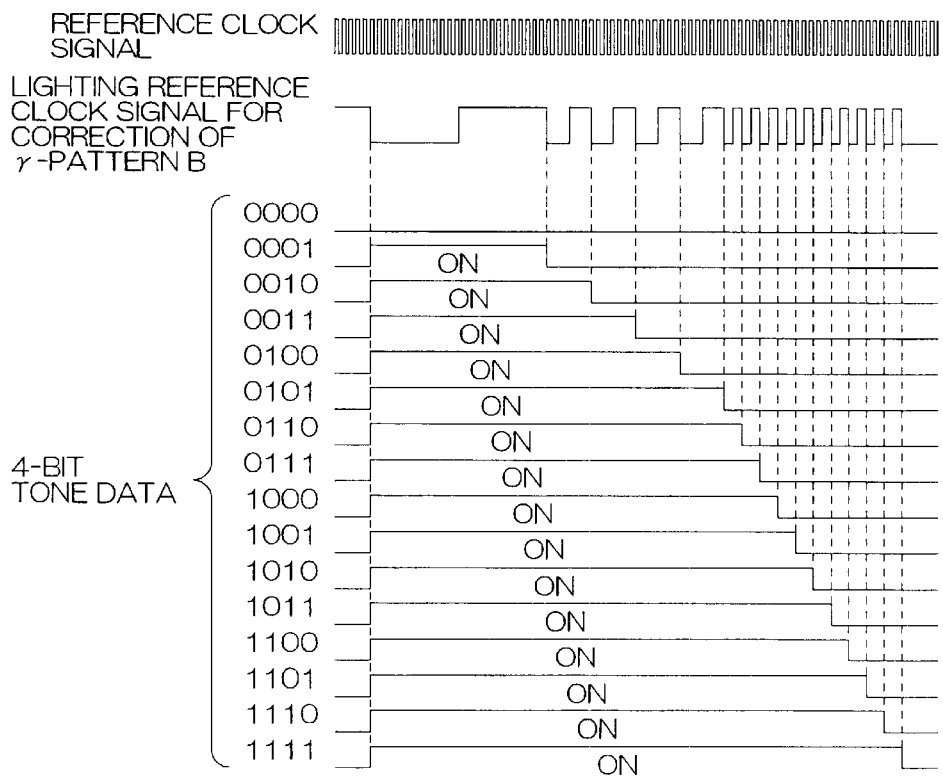
Figure 10A:
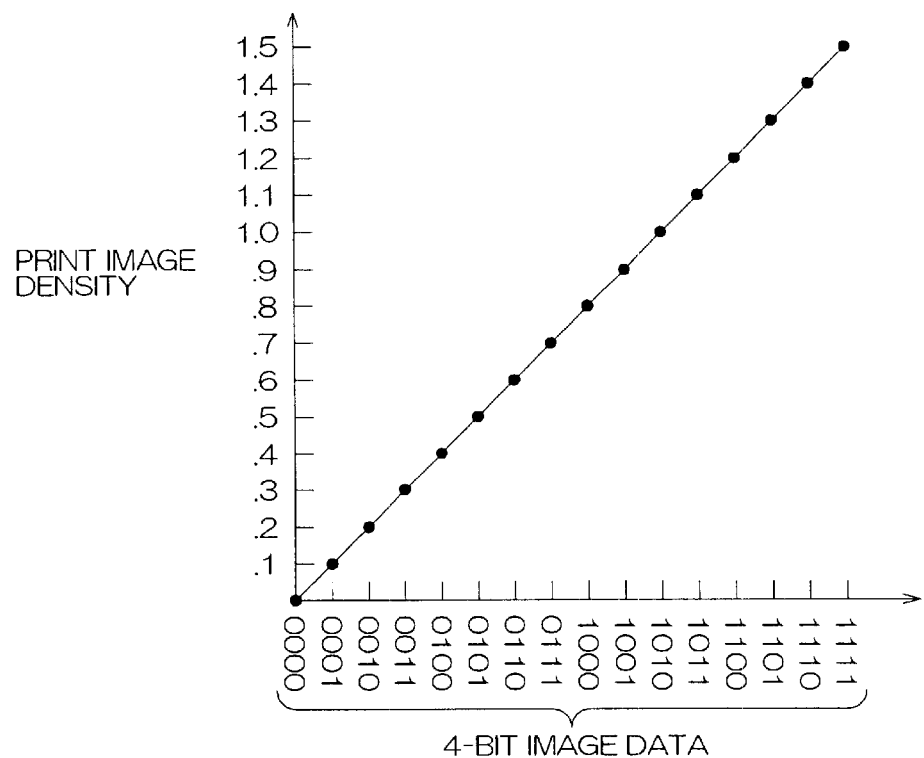
FIGS. 10A and 10B are diagrams for explaining a relationship between the image data and the image density.
Figure 10B:
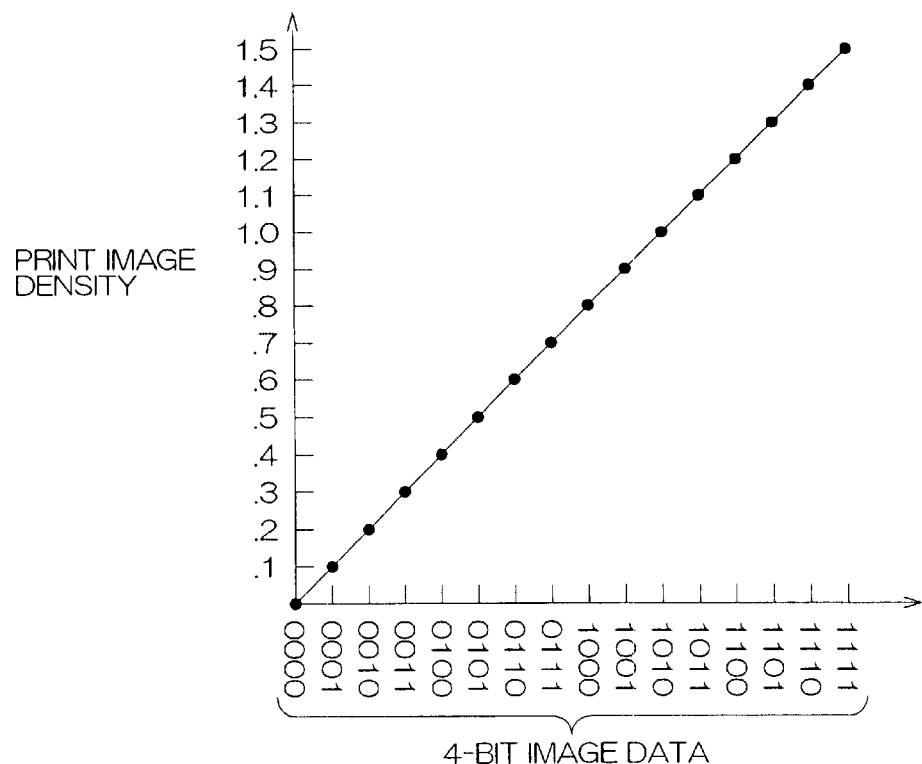

The waveforms of the lighting reference clock signals thus determined are respectively shown in the bottom of FIGS. 8A and 8B. As shown, the lighting reference clock signals for correction of the γ-pattern A and for the γ-pattern Beach have a rectangular waveform.

Where the LEDs of the printer are driven on the basis of either of the lighting reference clock signals for the γ-pattern correction, lighting period signals as shown in FIG. 9A or 9B are generated for the 4-bit tone data 0000 to 1111. When the printer is operated on the basis of the lighting period signals, the image density levels and the 4-bit tone data 0000 to 1111 are in a proportional relationship as shown in FIG. 10A or 10B, so that the image can be printed with required image density levels.

Figure 11A:
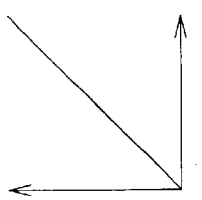
FIGS. 11A, 11B, 11C and 11D are diagrams for explaining lighting reference clock patterns.
Figure 11B:
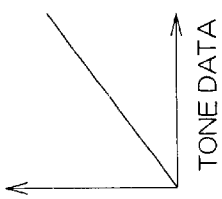
Figure 11C:
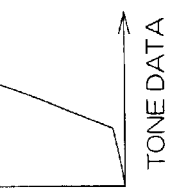
Figure 11D:
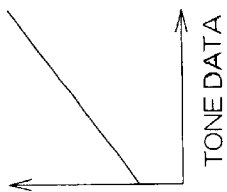

The lighting reference clock signal described above is used for the γ-pattern correction. Where the print image density is to be modified with respect to the inputted tone data, it is preferred to prepare a plurality of lighting reference clock patterns as shown in FIGS. 11A to 11D. FIG. 11A illustrates the lighting reference clock pattern for the aforesaid γ-pattern correction. With the use of the lighting reference clock patterns shown in FIGS. 11B to 11D, output characteristics as shown in the right side of FIGS. 11B to 11D are obtained, which each indicate a relationship between the tone data and the image density. A plurality of lookup tables for the generation of the plurality of lighting reference clock patterns are stored in the RAM 4, and selectively employed on the basis of an instruction from a user. Further, an additional lookup table may be prepared for an additional lighting reference clock pattern, or any of the existing lookup tables may be modified for modification of the lighting reference clock pattern.

Figure 12:
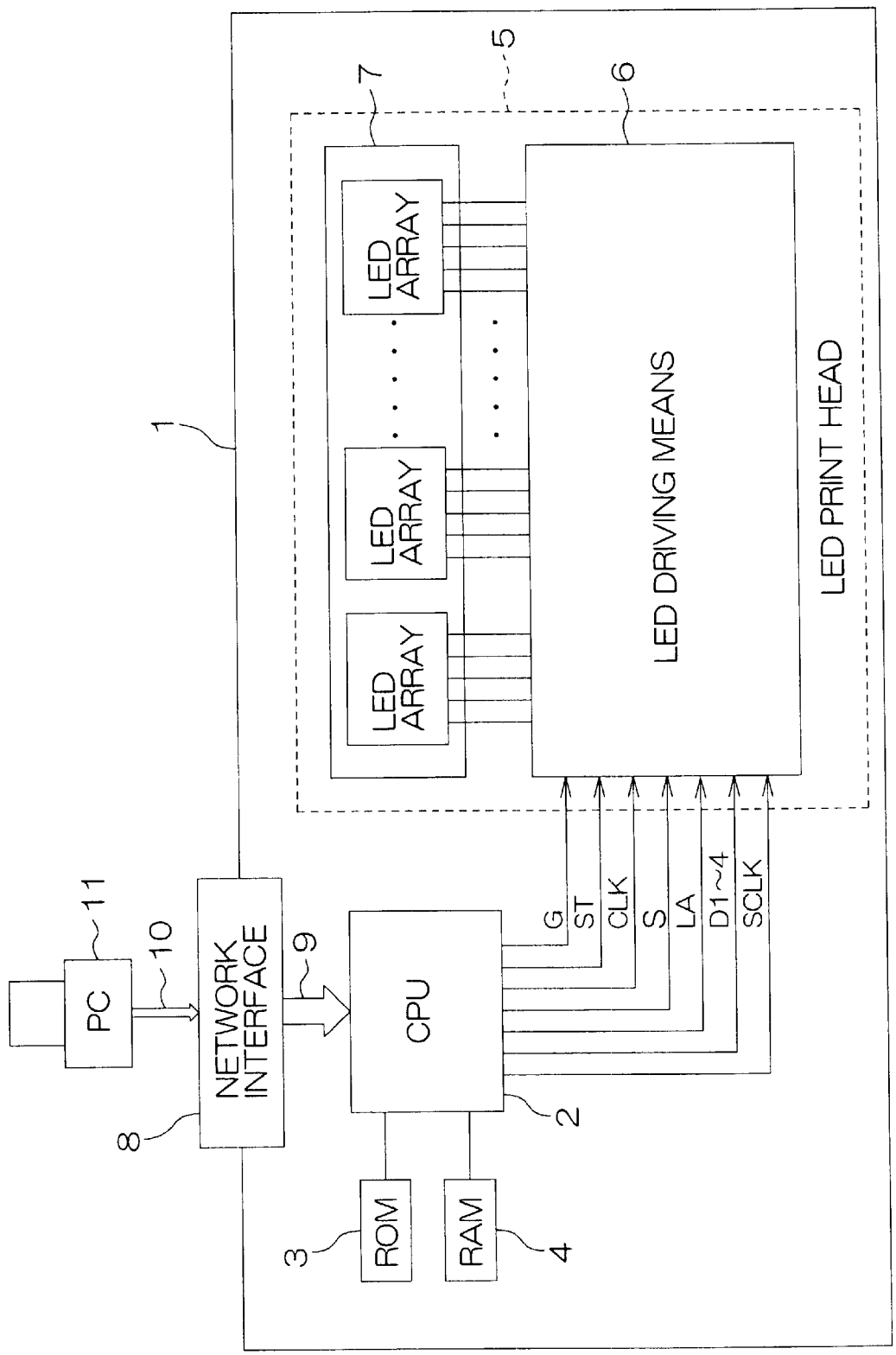
FIG. 12 is a block diagram illustrating the construction of a printer according to a second embodiment of the present invention.

A printer according to a second embodiment of the present invention has a construction as shown in FIG. 12. The principal construction of the printer is substantially the same as that shown in FIG. 2. Therefore, like components are denoted by like reference characters. In this embodiment, a lighting reference clock signal CLK1 is not inputted to an LED print head 5 from a CPU 2. Instead, a reference clock signal (CPU clock signal) and a signal for controlling the LED print head 5 are inputted to the LED print head 5 from a reference clock signal line CLK and from a signal line S, respectively.

Figure 13:
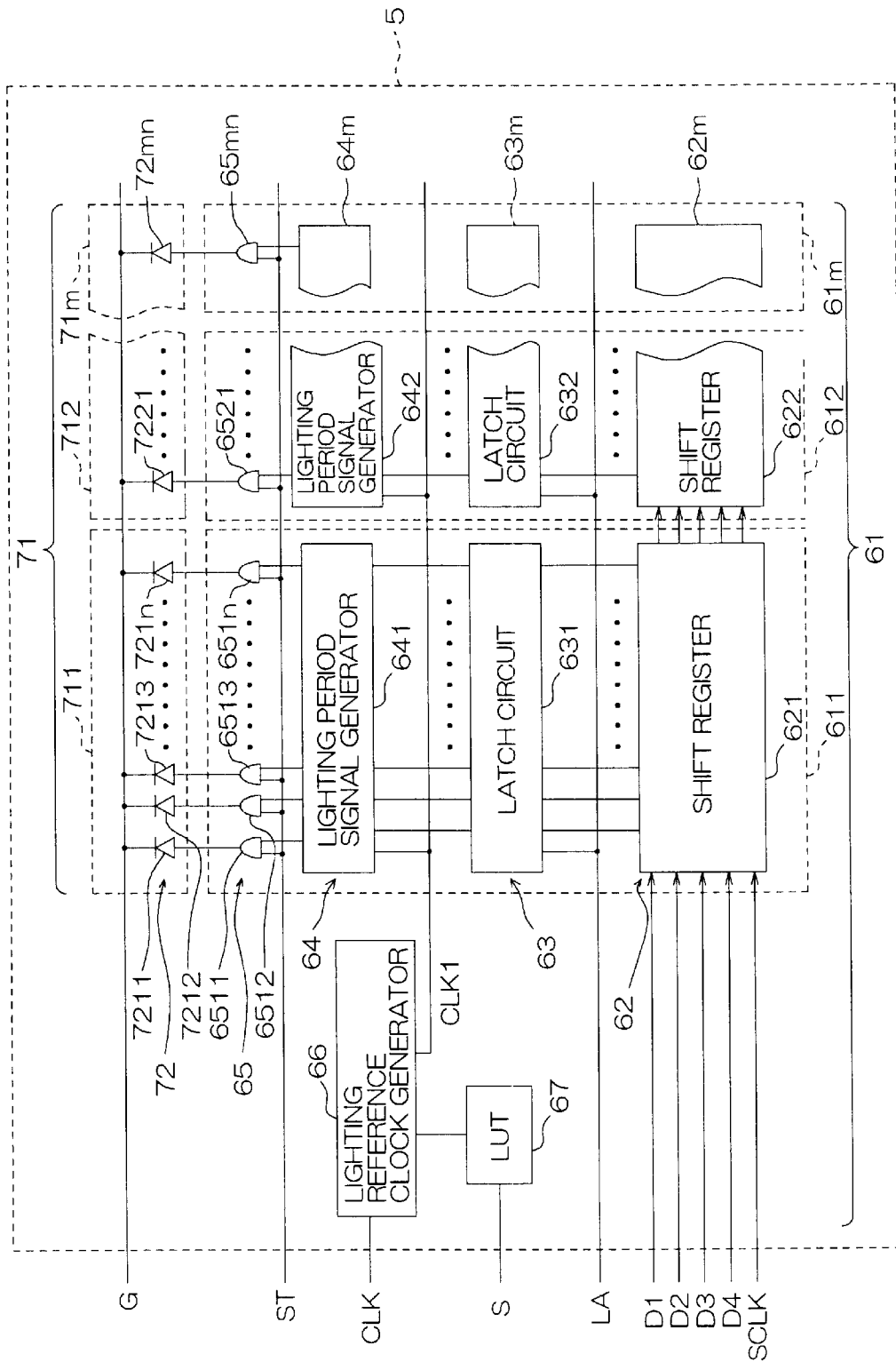
FIG. 13 is a block diagram illustrating the details of an LED print head of the printer according to the second embodiment of the invention.

FIG. 13 illustrates the details of the LED print head 5 of the printer of the second embodiment. The principal construction of the LED print head 5 is substantially the same as that shown in FIG. 3. Therefore, like components are denoted by like reference characters. The LED print head 5 according to this embodiment further includes a lighting reference clock generator 66 and an LUT 67. The LUT 67 stores therein lookup tables each indicative of a relationship between the image density and the lighting period represented by the number of the reference clock pulses as stored in the RAM 4 in the previous embodiment. The reference clock signal is inputted to the lighting reference clock generator 66, which generates a lighting reference clock signal as shown in FIGS. 11A to 11D on the basis of the reference clock signal and the data from the LUT 67. The lighting reference signal thus generated is inputted to the respective lighting period signal generators 64 via a signal line CLK1, and used in the same manner as in the previous embodiment.

Since the LED print head 5 per se has the function of generating the lighting reference clock signal which is otherwise generated by the CPU 2 on the basis of the lookup table in the RAM 4 in the previous embodiment, the load on the CPU can be alleviated. In addition, the LUT 67 can be accessed through the signal line S for the selection, modification and preparation of the lookup tables.

Figure 14:
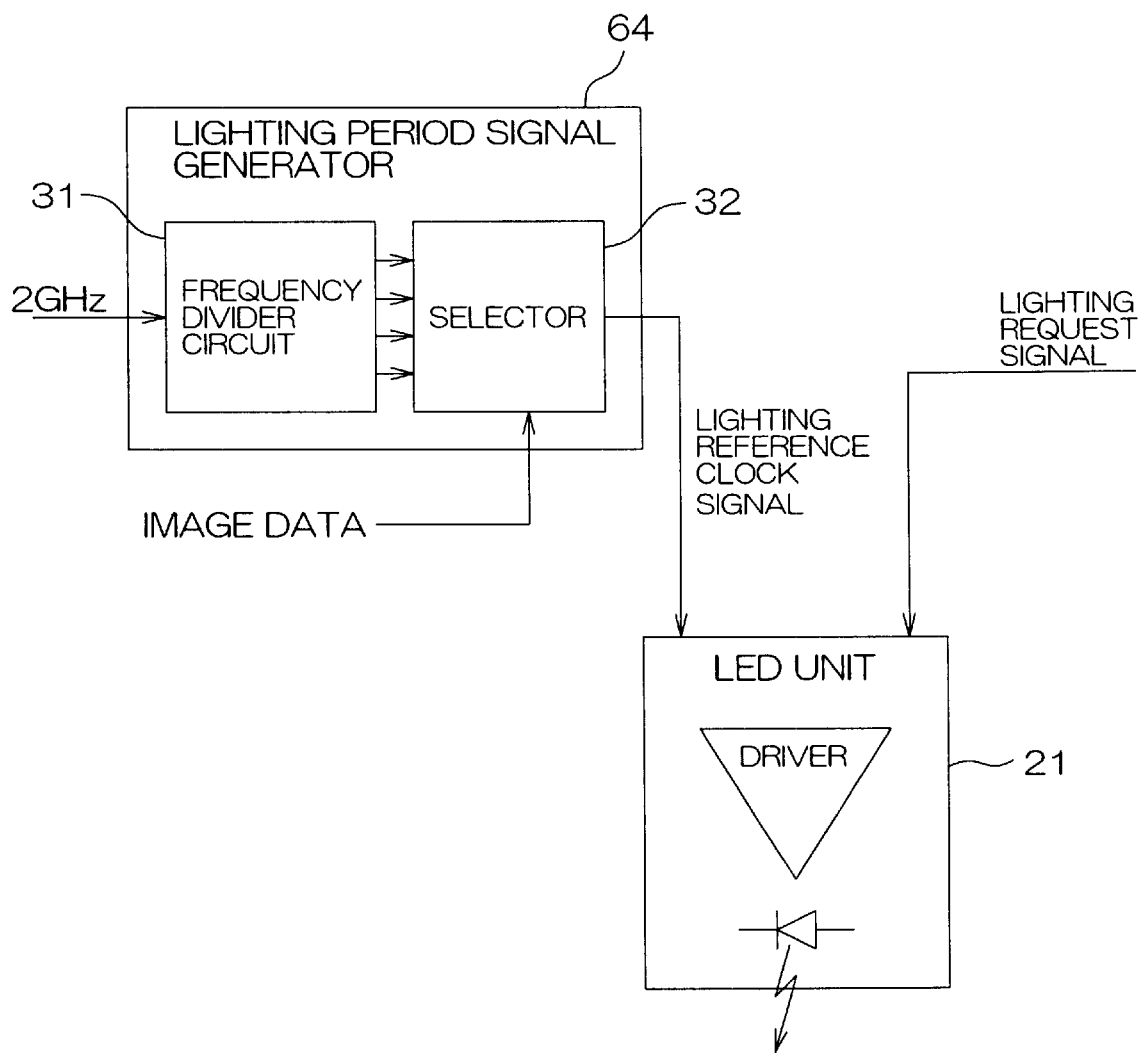
FIG. 14 is a block diagram for briefly explaining a third embodiment of the present invention.

FIG. 14 is a block diagram for briefly explaining a third embodiment of the present invention. More specifically, FIG. 14 illustrates the construction of a lighting control circuit provided in each LED unit 21 (including a single LED) in an LED print head 5. A lighting request signal (STROBE) is applied to the LED unit 21. Further, a lighting reference clock signal is applied to the LED unit 21 from a lighting period signal generator 64. The LED unit 21 controls the lighting period of the LED on the basis of the lighting request signal and the lighting reference clock signal.

The lighting reference clock signal is applied from the lighting period signal generator 64 as described above. The lighting period signal generator 64 includes a frequency divider circuit 31 for dividing the frequency of a 2-GHz CPU clock signal, for example. The 2-GHz CPU clock signal is subjected to the frequency division to provide plural types of clock signals by the frequency divider circuit 31. The resulting clock signals are applied to a selector 32. The selector 32 is switchable according to the image data, and a clock signal selected by the selector 32 is outputted as the lighting reference clock signal. As a result, the cycle period of the lighting reference clock signal to be outputted from the lighting period signal generator 64 can be changed.

Figure 15:
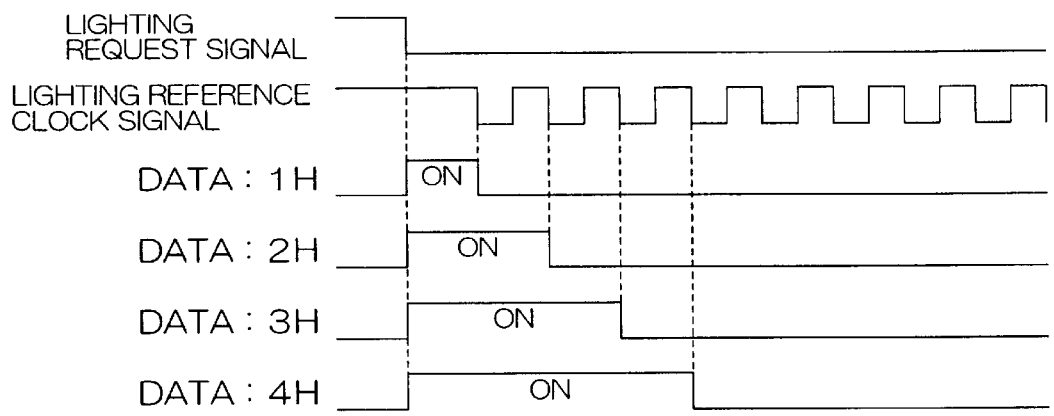
FIG. 15 is a timing chart for explaining conventional LED lighting control for reference.
Figure 16:
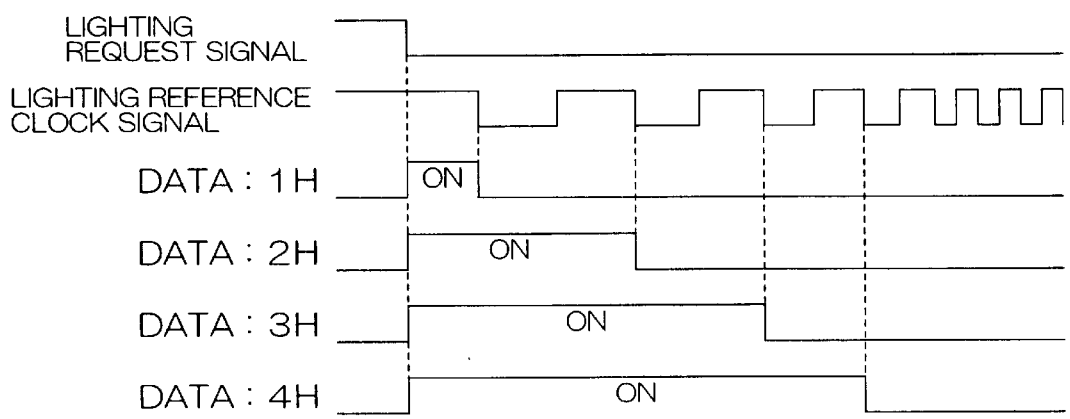
FIG. 16 is a timing chart for explaining LED lighting control to be performed by a lighting control circuit according to the third embodiment of the invention.

FIG. 15 illustrates a timing chart for the conventional LED lighting control for reference, and FIG. 16 illustrates a timing chart for LED lighting control to be performed by the circuit shown in FIG. 14 according to this embodiment. As apparent from a comparison of FIG. 15 with FIG. 16, the lighting period is controlled by the timing of the falling edges of the lighting reference clock signal having a constant cycle period in the conventional LED control. Therefore, the LED lighting period to be controlled according to the tone level of the image data has a length which is an integral multiple of the cycle period of the lighting reference clock signal.

In this embodiment, on the other hand, the cycle period of the lighting reference clock signal can variably be set as shown in FIG. 16. In other words, the timing of the falling edges of the lighting reference clock signal can be changed. Thus, the LED lighting period can have any desired length which is not limited to an integral multiple of the cycle period of the lighting reference clock signal by changing the timing of the falling edges of the lighting reference clock signal according to the tone level of the image data. Of course, the lighting period may be controlled by the timing of the rising edges of the lighting reference clock signal.

Next, an explanation will be given to relationships between the tone level of the image data, the LED lighting period and the density of a formed toner image.

Figure 17:
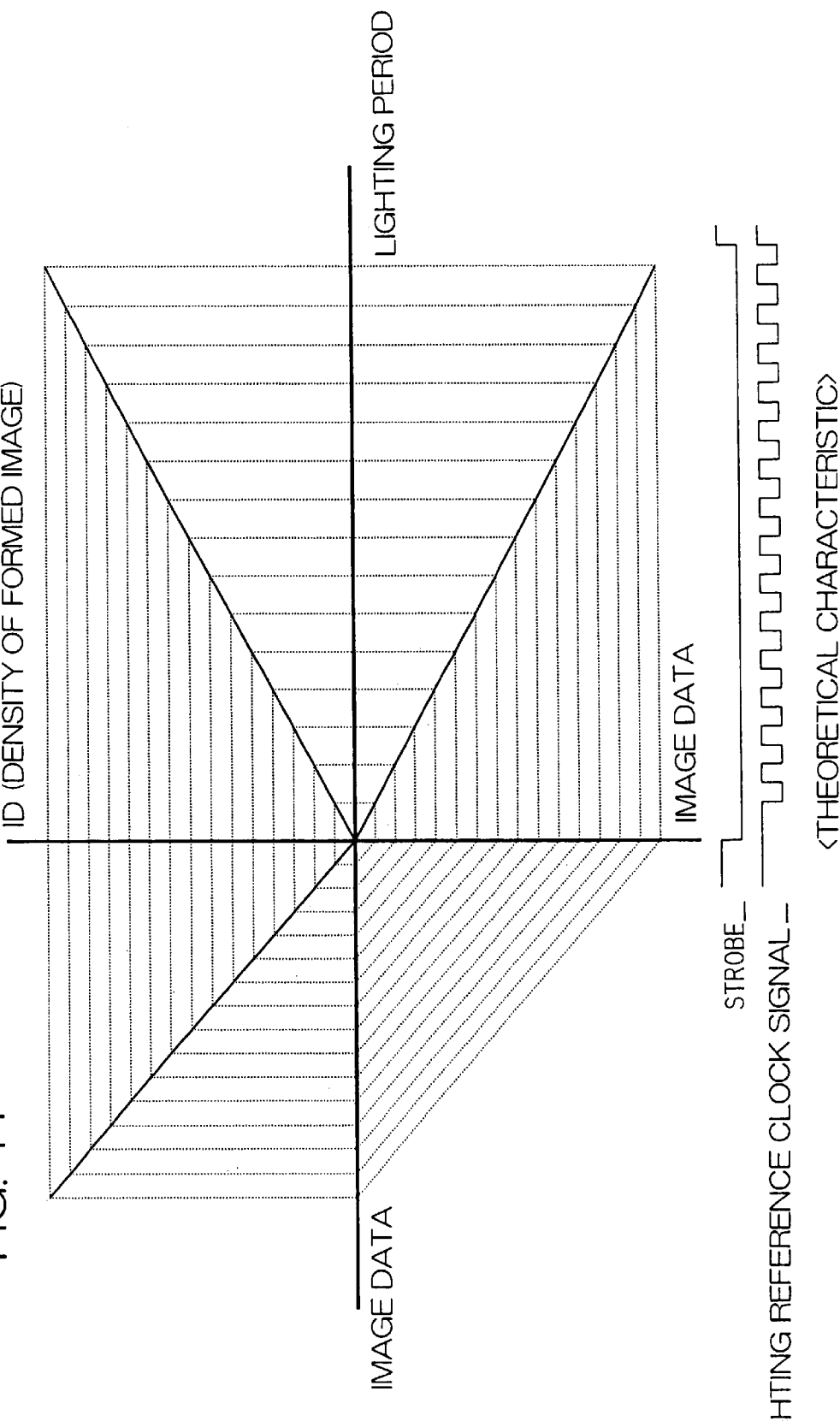
FIG. 17 is a graph illustrating theoretical relationships between the tone level of image data, a lighting period and the density of a formed toner image.

FIG. 17 is a graph illustrating theoretical relationships between the tone level of the image data, the lighting period and the density of the formed toner image. If the relationships between the tone level of the image data, the lighting period and the density of the formed toner image (ID) are all linear as shown in FIG. 17, a toner image can be formed with its density levels being consistent with the tone levels of the image data without the need for changing the cycle period of the lighting reference clock signal.

Figure 18:
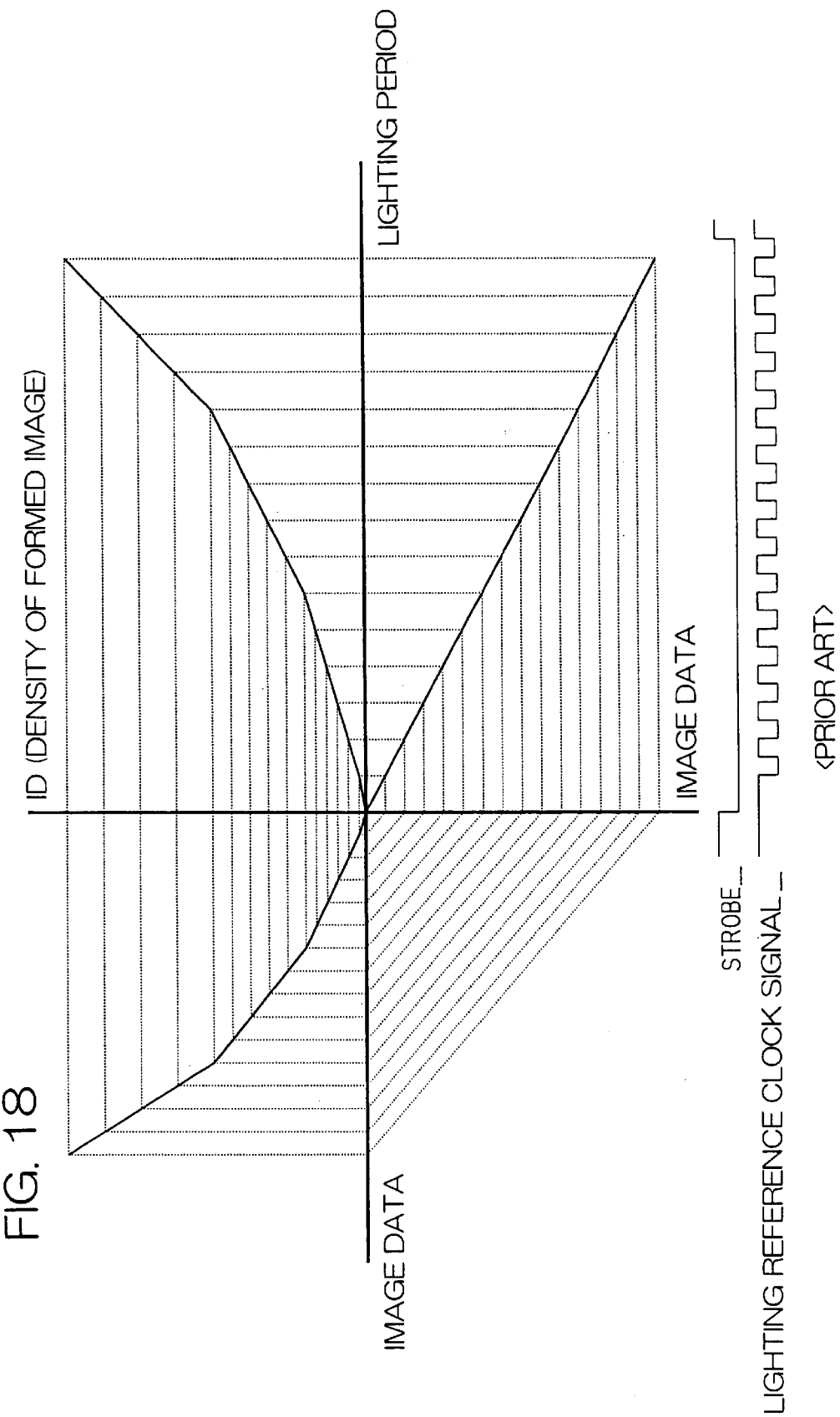
FIG. 18 is a graph illustrating relationships between the tone level of image data, a lighting period and the density of a formed toner image obtained through the conventional lighting control timing.

In practice, however, the tone level of the image data and the density of the formed toner image are not in a linear relationship, but in a nonlinear relationship as shown in FIG. 18. If the lighting period is controlled according to the tone level of the image data on the basis of the lighting reference clock signal having a constant cycle period, the tone level of the image data is not reflected on the density of the formed toner image. Therefore, the tone reproducibility is disadvantageously deteriorated, for example, in a toner image portion having a lower density.

In this embodiment, the cycle period of the lighting reference clock signal (i.e., the timing of the falling edges of the lighting reference clock signal) is variably set as shown in FIG. 19, whereby the LED lighting period can be controlled so as to have a length which is not an integral multiple of the lighting reference clock signal in accordance with the tone level of the image data on the basis of a nonlinear characteristic. This makes it possible to control the amount of toner to be caused to adhere onto an exposed area of the photoreceptor drum by the lighting of the LEDs, so that the density of the formed toner image can linearly be correlated with the tone level of the image data.

As described above, the apparatus according to the present invention ensures image formation with excellent tone reproducibility by variably setting the cycle period of the lighting reference signal for controlling the lighting period of each of the LEDs provided in the LED print head.

It should be understood that the present invention be not limited to the embodiments described above, but various modifications may be made within the scope of the appended claims.

What is claimed is:

1. An electrophotographic image forming apparatus which includes an LED print head having a multiplicity of LEDs disposed in an array for exposure of a photoreceptor surface, t e image forming apparatus comprising:

lighting period setting means which predefines a relationship between an image density and a lighting period; and LED driving means which reads a lighting period according to a tone level of inputted image data from the lighting period setting means, and lights an LED of the LED print head for the read lighting period, wherein the light ng period setting means predefines the relationship between the image density and the lighting period by a lighting reference clock signal which has a cycle period variable depending on an image tone level on the basis of a γ-characteristic of the image forming apparatus, wherein the LED driving means comprises a tone data counter which outputs a count number according to the tone level of the inputted image data, and a frequency division counter which divides a frequency of the lighting reference clock signal read out of the lighting period setting means to output pulses which are equal in number to the count number, and provides the pulses outputted from the frequency division counter as the lighting period.

2. An image forming apparatus as set forth in claim 1, wherein the lighting period setting means includes a lookup table in which a relationship between the tone level and a pulse number of a reference clock signal which is a CPU clock signal of a CPU serving s a control center of the image forming apparatus is matched depending upon the γ-characteristic of the image forming apparatus, and generates the lighting reference clock signal having a cycle period variable depending on an image tone level on the basis of the lookup table.

3. An image forming apparatus as set forth in claim 2, wherein the relationship between the tone level and the pulse number of the reference clock signal is determined on the basis of a tone level checking patch printed by the image forming apparatus.

4. An image forming apparatus as set forth in claim 2, wherein the lookup table includes a plurality of lookup tables, and one of the lookup tables is selected for the generation of the lighting reference clock signal.

5. An image forming apparatus as set forth in claim 3, wherein the lookup table is rewritable.

6. An image forming apparatus as set forth in claim 1, wherein the lighting period setting means is provided in a CPU which serves as a control center of the image forming apparatus, and the lighting reference clock signal is applied to the LED driving means from the CPU.

7. An image forming apparatus as set forth in claim 1, wherein the lighting period setting means is provided in the LED driving means, and the reference clock signal is applied o the LED driving means from a CPU which serves as a control center of the image forming apparatus.

* * * * *